United States Patent [19]

Chaffee

[11] Patent Number: 4,790,569
[45] Date of Patent: Dec. 13, 1988

[54] REVERSE TAPER RING LOCK COUPLER AND METHOD

[75] Inventor: Bradley A. Chaffee, Littleton, Colo.

[73] Assignee: The Gates Rubber Company, Denver, Colo.

[21] Appl. No.: 2,072

[22] Filed: Jan. 12, 1987

[51] Int. Cl.⁴ .............................................. F16L 33/22
[52] U.S. Cl. ...................................... 285/40; 285/255; 285/242; 285/245
[58] Field of Search ................. 285/40, 245, 242, 255, 285/259

[56] References Cited

U.S. PATENT DOCUMENTS

| 186,855 | 1/1877 | Leland . | |
|---|---|---|---|
| 367,790 | 8/1887 | Darrah, Jr. . | |
| 626,210 | 5/1899 | Deitz . | |
| 756,350 | 4/1904 | Garbutt . | |
| 837,558 | 12/1906 | Gold . | |
| 1,064,154 | 6/1913 | Miller . | |
| 1,588,606 | 6/1926 | Oden | 285/245 X |
| 2,158,538 | 5/1939 | Gish | 285/245 X |
| 2,937,892 | 5/1960 | Prescott, Jr. | 285/245 |
| 3,222,091 | 12/1965 | Marshall . | |
| 3,560,028 | 2/1971 | Ohba . | |
| 4,238,132 | 12/1980 | Palmaer . | |
| 4,583,767 | 4/1986 | Hansen | 285/40 |

FOREIGN PATENT DOCUMENTS

| 673383 | 11/1963 | Canada | 285/242 |
|---|---|---|---|
| 112002 | 10/1968 | Denmark | 285/255 |
| 1180585 | 10/1964 | Fed. Rep. of Germany | 285/242 |

Primary Examiner—Randolph A. Reese
Assistant Examiner—Anthony Knight
Attorney, Agent, or Firm—H. W. Oberg, Jr.; C. H. Castleman, Jr.; Jack E. Ebel

[57] ABSTRACT

A T-shaped connector for use in automotive radiator cooling systems, in which each nipple is radially enlarged to form a substantially frusto-conical obverse taper, an apex, and a substantially frusto-conical reverse taper having one or more shouldered steps cut into it. The height of the apex is determined as a function of the elastic properties of the rubber hose to be connected to the coupling, a rubber hose is slid onto and over the radially enlarged portion, and a substantially frusto-conical ring is seated onto that portion of the hose fitting over the reverse taper of the nipple.

33 Claims, 4 Drawing Sheets

REVERSE TAPER RING LOCK COUPLER AND METHOD

FIELD OF THE INVENTION

This invention comprises a system for minimizing the problem of cold temperature leakage between elastomeric hoses and couplings and a product to implement that system. More specifically, the invention comprises a coupling that can join a plurality of hoses in an internal combustion engine cooling system, which resists the phenomena of cold leakage as the temperature of the coolant in the system cycles through warmer and colder temperatures.

BACKGROUND OF THE INVENTION

A problem that has been especially acute in clamping rubber hoses to metal couplings in automotive radiator coolant systems has been that of cold temperature leakage. This phenomena occurs after an internal combustion engine has been running long enough to raise the temperature of its coolant and is then turned off long enough to allow the coolant to cool down. As the coolant drops to its lower temperature, the components of the cooling system logically also fall in temperatures. Like most materials, the dimensions of the components increased when they got hotter and then began to decrease as they cooled down. Different materials, however, have different coefficients of expansion, meaning not only that they expand at different rates when they get hot, but also that they contrast at different rates when they cool down. The coefficient of most rubber elastomers is generally on the order of ten times as great as the coefficient of expansion of steel. See Rubber Technology and Manufacture, edited by C. M. Blow, Institution of the Rubber Industry, 1971, at page 294. Thus, of two articles having identical dimensions at a given temperature, one made of steel and one made of rubber, the article made of rubber will contract to a smaller dimension than the article made of steel when the two are simultaneously cooled to the same lower temperature.

Until now, it has been virtually a universal practice among manufacturers to connect the rubber hoses of the cooling system to metal couplings in the cooling system by fitting the hose over a metallic nipple and fitting a clamp over the end portion of the hose that fits over the nipple. The clamp is then tightened down, thereby tightly compressing that portion of the rubber in between the clamp and the nipple. Assuming the clamp has been tightened hard enough, this works well as the temperature and the pressure of the coolant in the system rise. After the engine has been turned off and the temperature of the components begins to fall, however, the metal of the nipple and the rubber in contact with it and under compression begin to contract, although at different rates. Since the rubber is contracting faster than the metal, the part of the rubber hose under compression in contact with the nipple actually begins to shrink away from the metal, permitting the coolant in the system to seep past the connection, thereby resulting in the cold temperature leakage. In recent years, this has been one of the most frequent sources of consumer warranty complaints against automobile manufacturers.

Therefore, a new approach to the problem of engineering a coupling had to be undertaken which got around the problem of metal and rubber having the different coefficients of expansion and separating from each other when they were clamped to each other. Materials science engineers now know that rubber responds differently to temperature depending on whether it is in a compressed state, an unstressed state, or under tension. Rubber under tension has a negative coefficient of thermal expansion, and its Young's modulus will increase as temperature increases, if a given article of rubber is under tension. For instance, if a stretched rubber band is heated, the rubber band will contract if the external load is not changed. See Elements of Material Science and Engineering by Lawrence H. Van Vlack, Addison Wesley 1985 at page 227. Since rubber displays a negative coefficient of expansion when it is under tension, it will, to a certain degree, expand as its temperature is decreased. This results in an interesting phenomena for a piece of rubber hose that has been stretched over a nipple without having a clamp exerting any appreciable compressive force on it. The act of stretching the rubber circumferentially to fit over the nipple has caused it to expand circumferentially and decrease in wall thickness. If the rubber and the metal are now simultaneously cooled to a lower temperature, the metal characteristically contracts, but the rubber will, within a certain range, increase its wall thickness as the temperature decreases, thereby maintaining contact with the metal instead of shrinking away from it.

This phenomena therefore would have applications for the prevention of cold leaks within a certain temperature range. However, use of this application alone would not have much practical value in any system to be put under anything more than nominal working pressure, since the axial forces building up in the hose under increasing pressure would simply blow the hose off the coupling connected in this manner.

A solution to this problem which has been known for a long time is to use a coupling having obverse and reverse tapers on it, fitting the hose over the tapers, and then fitting a similarly tapered ring over the reverse taper of the coupling. See U.S. Pat. No. 756,350, issued Apr. 5, 1904. The reverse taper approach to the problem was found to be useful as a hose mender. However, it was not then known that the height of the apex between the obverse and reverse tapers could be varied in relation to the internal diameter of the hose to be fitted, so as to find an optimal point at which to stretch the hose so as to maximize the negative coefficient of expansion of the rubber within the temperature range that the coolant of a cooling system would rise or fall within. Additionally, it was thought at that time that the external ring had to serve the function of tightly compressing the rubber against the reverse taper of the nipple. Thus, the interior of the ring would not be the same angle as the reverse taper of the nipple, but rather smaller than the reverse taper of the nipple so as to compressively grip the rubber more tightly at one end of the ring. This feature is not necessary at all, because, when pressure is applied to the fluid in the system, axial forces tend to pull the hose away from the coupling, and in so doing, the ring is pulled along by the exterior surface of the hose so as to fit more snugly against the reverse taper as the pressure in the hose increases. Since the connection will get tighter as the pressure increases, the hose will fail due to bursting before it will blow off a coupling made in this manner.

SUMMARY OF THE INVENTION

In brief summary, the invention comprises a method of sealing the terminal end of an elastic hose and a hose connector so as to prevent cold temperature fluid leakage, comprising the steps of constructing a nipple to be axially aligned with the terminal end of the hose, the nipple having an end portion that is radially enlarged, then sliding the terminal end of the hose onto, and stretching it to fit over, the radially enlarged end of the nipple, thereby radially deflecting and putting under radial tension an end portion of the hose, with the amount of radial tension being determined by the extent of enlargement of the radially enlarged end portion of the nipple. Accordingly, the radial tension on the stretched elastic hose will be sufficient to adequately seal the hose and hose connector against fluid leakage. The invention further comprises an article of manufacture unique to carry out this method.

DETAILED DESCRIPTION OF THE DRAWINGS

Figure 2:
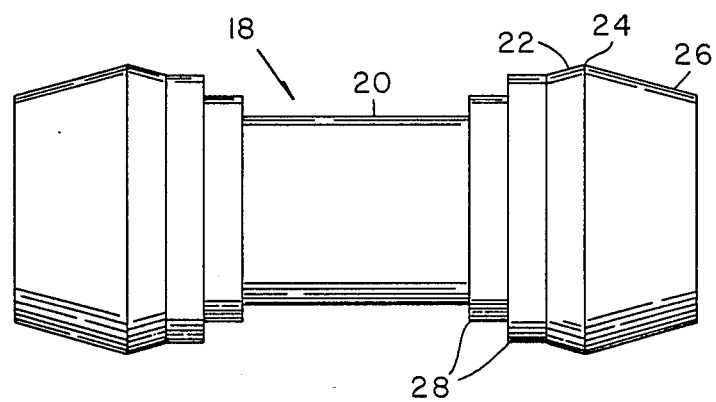
FIG. 2 is a side view of a nipple with two terminus ends.

The reverse taper ring lock coupler and method is best thought of as a system for finding the optimal amount that a given elastomeric hose must be stretched over the end portion of a nipple. This is especially true of rubber, but will also be true of any elastomeric polymer made of kinked, long chain, organic molecules similar to rubber. The method works best if the amount of stretch is maximized at a certain point by having a radially enlarged end portion of the nipple that has an apex. One preferred embodiment of such a nipple is shown at FIG. 2. A coupling is shown there generally at 18, having a tubular body 20. Moving from the end of the coupling inward, the exterior diameter increases gradually at an obverse taper 26, rising to an apex 24. From the apex, the exterior diameter gradually decreases along a reverse taper 22. In a more preferred embodiment of the invention, one or more step-like shoulders 28 are cut into the reverse taper 22. In effect, this creates a plurality of apexes.

Figure 1:
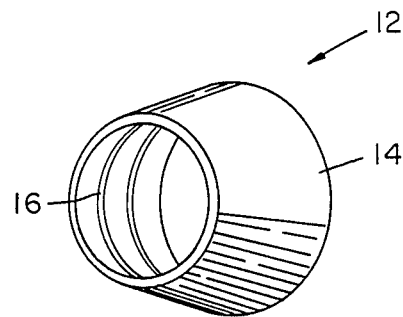
FIG. 1 is a view in perspective of a reverse taper lock ring.
Figure 3:
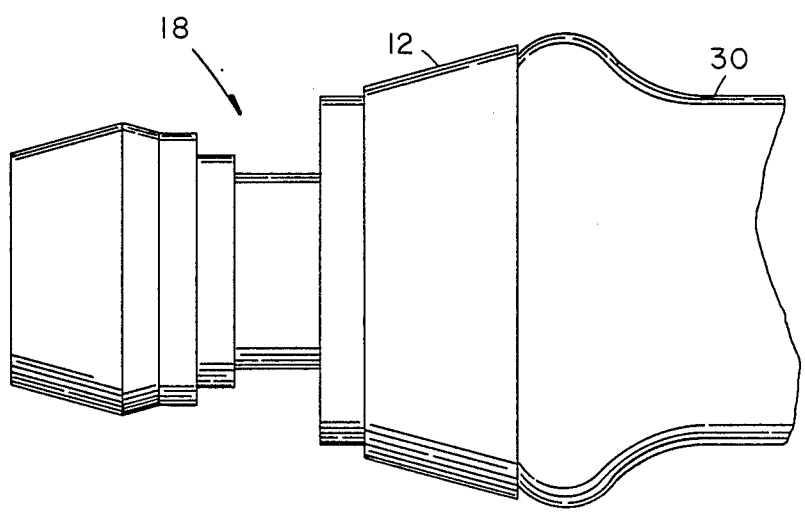
FIG. 3 is a side view of a nipple with two terminus ends, with one terminus end having the terminal portion of a hose fitted over it, and having a reverse taper lock ring fitted over a portion of the hose.

The terminal end of the hose is fitted over a terminus of the coupling of the invention as shown in FIG. 3. There, the hose 30 has been fitted over the coupling 18, and can be seen to cover the obverse taper, apex, reverse taper and shouldered steps. In addition, FIG. 3 shows the ring 12 illustrated in FIG. 1 fitted over that portion of the hose that covers the reverse taper portion of the nipple, and having substantially the same angle of taper.

One important element of the invention is the determination of how great to make the apex on the radially enlarged end of the nipple. The diameter of the apex will be determined by the calculated minimum radial deflection required to achieve a seal, given the known pressures that the system will be operating under, and the elastic properties of the elastomer chosen to construct the hose. Given these variables, the minimal radial deflection required to seal against pressure is defined by the cubic polynomial:

$$\alpha\Delta^3 + \beta\Delta^2 + \gamma\Delta - \delta = 0$$

where
$\alpha = S^3[S\{k^2(1/S-1)+(1-1/s)\} - q\{k^2(1+\nu)-(1-\nu)\}]$
$\beta = 2S^2[E\{ka(1/s-1)+b(1-1/s)\} - q\{(b/2k^2 + ka)(1+\nu)+3b/2(1-\nu)\}]$
$\gamma = S[E\{a^2(1/s-1)+b^2(1-1/s)\} - q\{(2-bka+a^2)(1+\nu)+3b^2(1-\nu)\}]$
$\delta = ab[a^2(1+\nu)+B^2(1-\nu)]$
$k = 2ab/[a^2+b^2+\nu(a^2-b^2)]$
a = initial undeflected outside radius of hose, in inches
b = initial undeflected inside radius of hose, in inches
$\nu$ = Poisson's ratio of the hose
S = degree of set the material takes, expressed decimally
q = desired pressure to seal against, in psi
E = Young's modulus of the material, at the temperature at which q pressure must be sealed against.

Figure 4:
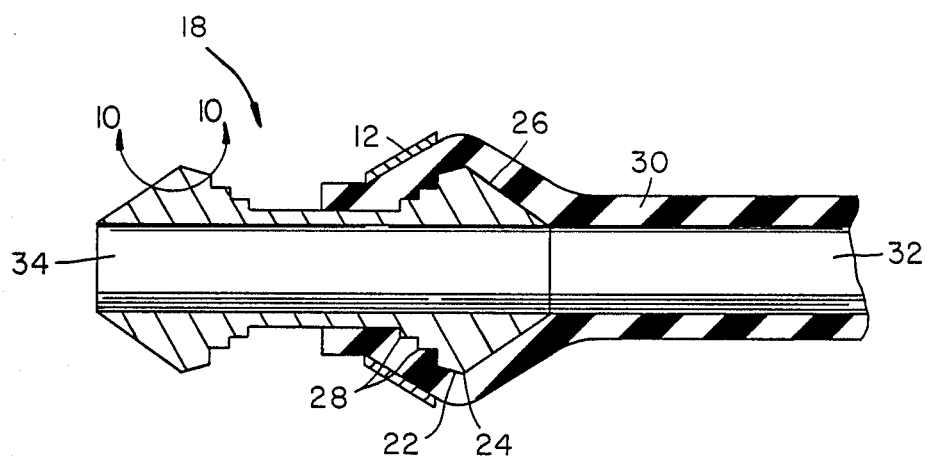
FIG. 4 is a cutaway side view of a nipple with two terminus end portions having a terminal end portion of the hose fitted over and having a reverse taper lock ring fitted over a portion of the hose.
Figure 5:
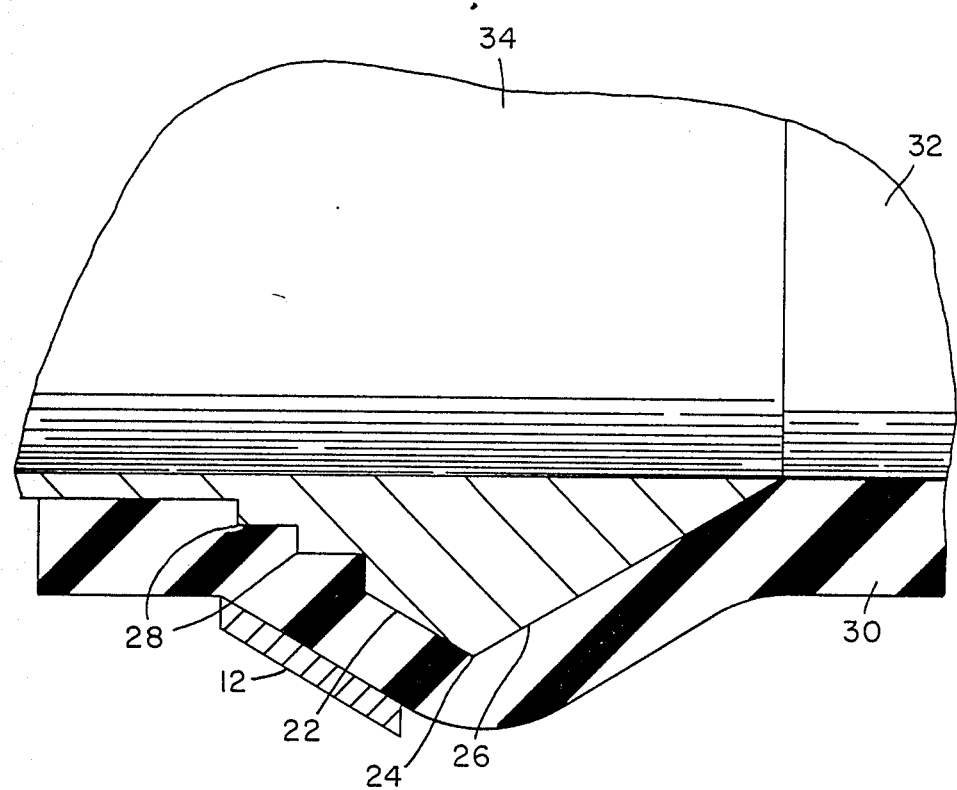
FIG. 5 shows an enlarged and more greatly detailed cutaway side view, concentrating on the area of contact between the tapered surfaces of the nipple, the hose, and the reverse taper lock ring.
Figure 6:
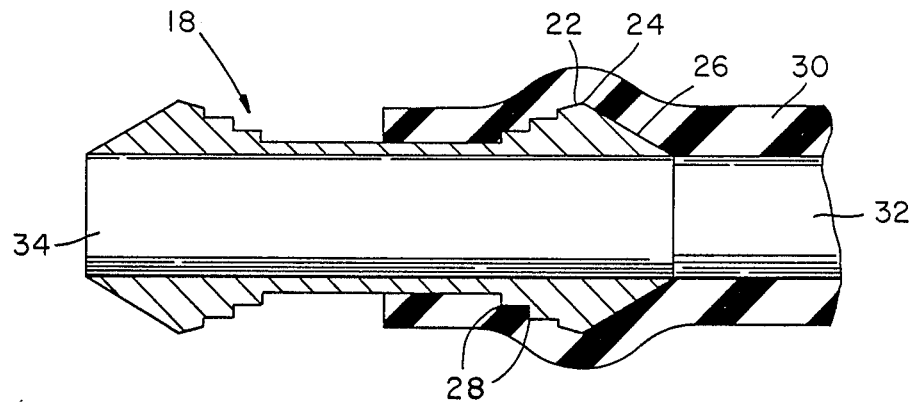
FIG. 6 is a cutaway side view of the hose mounted on the nipple without the reverse taper lock ring.
Figure 7:
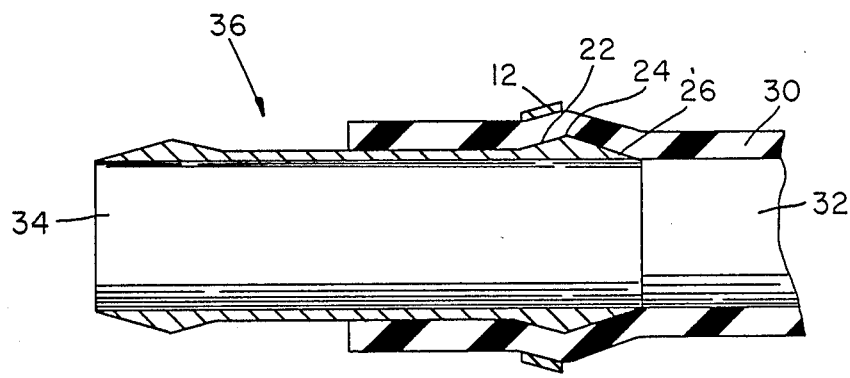
FIG. 7 is a cutaway side view of an alternative embodiment of the nipple.
Figure 8:
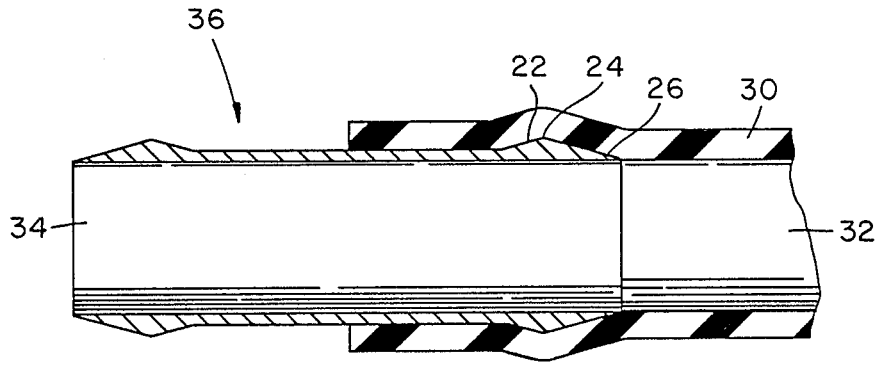
FIG. 8 is a cutaway side view of another alternative embodiment of the nipple, except without the reverse taper lock ring.

Having calculated a minimal radial deflection using this relationship, one can then proceed to manufacture a nipple having a radially enlarged end with an apex meeting the minimum dimensions calculated. The actual shape of the radial enlargement is not critical, provided the minimal dimensional requirements for the apex of it have been met. However, we have found it to be preferable to shape the radial enlargement with an obverse taper, an apex and a reverse taper, and even more preferable to fabricate one or more steplike shoulders into the reverse taper. The reason for this is that each steplike shoulder in effect creates an additional apex against which the interior surface of the hose rests and is somewhat stressed after the hose has been fitted onto the nipple. This is shown in FIG. 4. At FIG. 4, the hose 30 has been fitted over the nipple 18, covering the obverse taper 26, apex 24, the reverse taper 22, and multiple shoulders cut into the reverse taper 28. Over the portion of the hose covering the reverse taper, the reverse taper lock ring 12 has been seated. The interior bore of the hose 32 is in contact with each of these physical features of the radially enlarged portion of the nipple, as shown in greater detail in FIG. 5. It should also be noted here that the angle of taper of the reverse taper lock ring 12 is substantially the same as that of the reverse taper 22. It should be noted here that the ring 12 is not seated on to the exterior of the hose 30 with a great deal of force, as its function is not to guard against cold temperature leakage, but rather to prevent the hose friom blowing off as pressure increases. Indeed, if the hose is to be placed in service in a system that will remain at sufficiently low pressures, the lock ring will not be required at all, provided that the height of the apex on the radially enlarged portion of the nipple has been correctly calculated to be of adequate diameter, given the elasetic properties of the rubber used in the hose. This is illustrated by the alternative embodiment shown in FIGS. 6 and 7.

If desired, the interior of the reverse taper lock ring can have a helical bead 16 raised on its surface, in order to enable an installer to screw the lock ring onto the outer surface of the hose fitted over the nipple. In this manner, more precise control could be exerted over the tightness with which the ring was mounted onto the hose.

Figure 9:
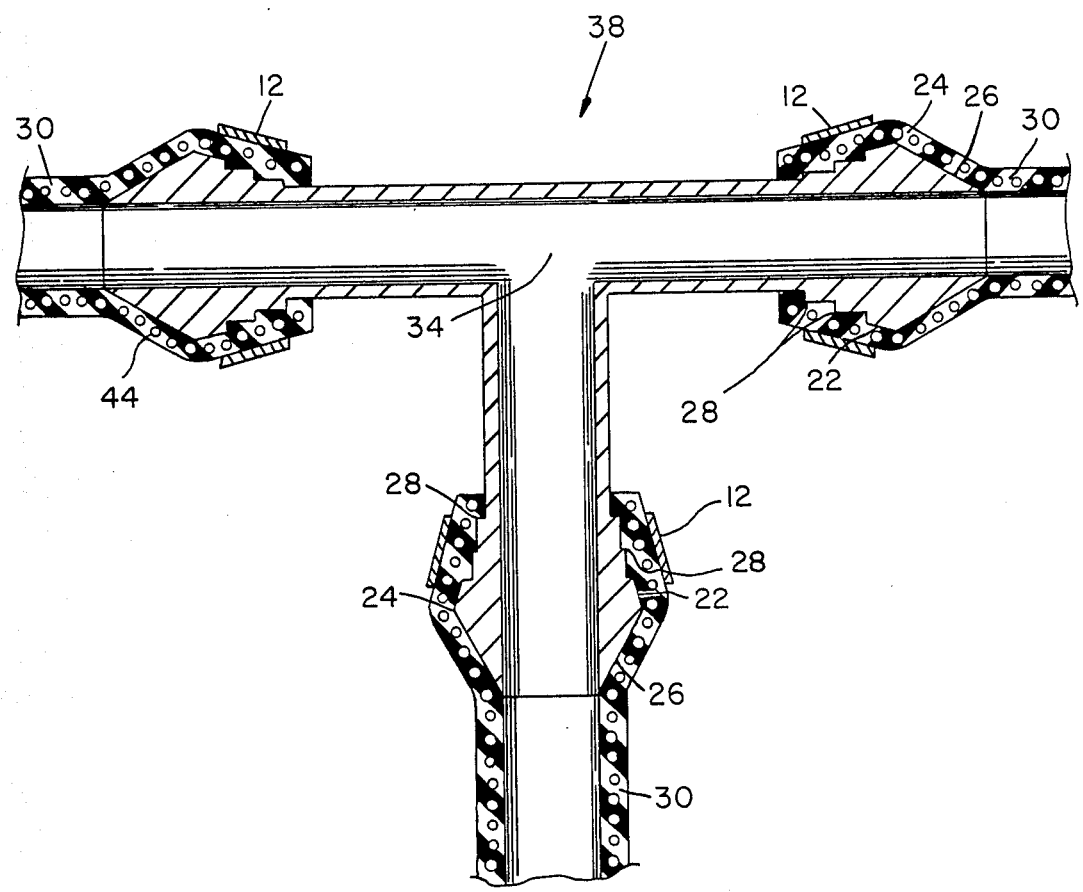
FIG. 9 is a cutaway side view of the most preferred embodiment of the coupling system.

The most preferred embodiment 38 of the coupling is shown in FIG. 9. Here, a T shaped coupling 34 is shown connecting three (3) hose ends, which would be a common arrangement in an automotive cooling system hose junction. Naturally, any number of hoses could be connected to a properly configured fitting having the required number of radially enlarged nipples axially aligned with each hose to be connected.

Although it has been found that a combination of two (2) substantially frusto-conical tapers having an apex is the most preferred embodiment, it should be noted that the sides rising to the apex could also be convex shaped, concave shaped, or any combination thereof. If a reverse side taper ring is used, it would have to have essentially the same shape as that chosen for the reverse side, be it tape, convex or concave.

Figure 10:
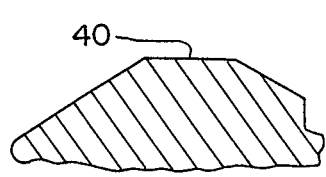
FIG. 10 is an enlarged partial view taken along the lines 10—10 of FIG. 4 but showing an alternate form of the invention.
Figure 11:
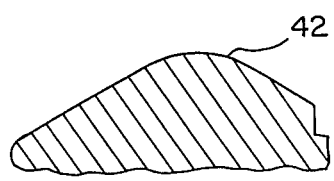
FIG. 11 is a view similar to FIG. 10 but showing an alternate form of the invention.

Additionally, provided the radially enlarged portion of the nipple reaches an apex sufficient to radially deflect a given hose by the calculated required amount, the apex need not necessarily be an angular apex as shown in FIG. 4, but could also be a truncated apex 40 as shown in FIG. 10 or a crowded apex 42 as shown in FIG. 11.

A product made in accordance with the method of the present invention, given the known elastic characteristics of the given rubber compound to be used, should be able to obtain a sufficient seal so as to prevent cold leakage down to a temperature equal to the glass transition point of the elastomer of the hose being connected. For most practical purposes, it would be sufficient if the product has been built so as to obtain a sufficient seal at temperatures as low as minus 40° F. Empirically, we have found that when the apex of the radially enlarged portion of the nipple is from 5% to 40% greater in diameter than the inside diameter of the hose, and in particular when the apex is 18% greater in diameter, that best cold leakage prevention results are obtained when using EPDM rubber or silicone rubber. Additionally, we have found that when the reverse taper rises to the apex at an angle of from 5° to 65°, and in particular at 26°, and where the obverse angle falls from the apex at an angle from 5° to 65°, and in particular at 30°, that the product works especially well with these elastomers.

Since textile reinforced rubber does not follow the rule of modulus of elasticity for reinforced materials, we have found that it has no effect on calculation of apex height to add a textile reinforcement 44 to the hose.

To summarize, a method of sealing the terminal end of one or more elastic hoses to a hose connector so as to prevent fluid leakage, and especially cold fluid leakage in a closed fluid containment system of the type wherein a fluid undergoes cyclic temperature changes comprises the following steps. One first constructs a nipple to be axially aligned with the terminal end of the hose ends, the nipple having one radially enlarged end portion for each end terminal to be connected and being shaped to form a substantially frusto-conical reverse taper, an apex and a substantial frusto-conical obverse taper. One then slides a terminal end of the hose onto and stretches it to fit over the obverse taper, apex and reverse taper of the nipple, thereby radially deflecting and putting under radial tension an end portion of the hose, the amount of radial tension being determined by the angle of the tapers and the height of the apex, and the radial tension being sufficient, given the elastic modulus of the elastomer, to adequately seal the hose and hose connector against cold fluid leakage. One would then complete all hose connections for the system, add fluid to the fluid containment system, and cycle the fluid through the system, simultaneously recycling the temperature of the fluid through hotter and colder temperatures.

It is thought that the reverse taper ring lock coupler and method of the present invention and many of its intended advantages will be understood from the foregoing description, and it will be apparent to those skilled in the art that various changes may be made in the form, construction and arrangement of the parts thereof without departing from the spirit and scope of the invention, or sacrificing all of its material advantages. The forms herein described are merely preferred embodiments, and the description herein should not be construed or interperted as the only embodiments. Although this description has largely discussed application of this invention to cooling systems of internal combustion engines, this is only one major application of the technology and other applications to the production of other products are not intended to be precluded. The following claims should therefore be interpreted as broadly as is reasonable.

What is claimed is:

1. In a closed fluid containment system of the type that includes an elastomeric hose coupled to a nipple wherein the hose has a coefficient of expansion greater than a coefficient of expansion of the nipple, the improvement of substantially eliminating cold temperature leakage of a fluid between the nipple and coupled hose, the improvement comprising using a nipple that has an obverse taper extending to a maximum diameter of the nipple and a reverse taper extending from the maximum diameter of the nipple, the rise and fall from the maximum diameter establishing a radial deflection that radially deflects and tensions an end portion of the hose against the nipple as established by an elastic modulus of the elastomer of the hose, and thereby seals the hose and the nipple against cold leakage.

2. In a method for connecting an elastomeric hose by sliding and stetching it over a nipple that has an obverse taper extending to a maximum diameter of the nipple and a reverse taper extending from the maximum diameter of the nipple, and wherein the hose has a coefficient of expansion greater than a coefficient of expansion of the nipple, the improvement of sealing the hose and nipple and substantially eliminating cold temperature leakage of a fluid between the nipple and hose at a temperature at which a desired pressure must be sealed against, the improvement comprising the steps of:

constructing the nipple to have the reverse taper rise to an apex at said maximum diameter and fall from the apex in an obverse taper, the rise to and fall from the maximum diameter establishing a minimum radial deflection for the hose as required to seal against the desired pressure at a temperature of and for the elastic modulus of the elastomeric material of the hose; and during the step of sliding and stretching the hose over the nipple, the steps of radially deflecting an end portion of the hose to at least said minimum radial deflection while simultaneously radially tensioning the end portion of the hose against the nipple and thereby sealing the hose and nipple against cold leakage.

3. The method as described in claim 2, in which the hose is radially deflected by the apex to a minimum radial deflection which is determined as being a function of the elastic properties of the hose to be connected, in accordance with the relationship:

$$\alpha \Delta^3 + \beta \Delta^2 + \gamma \Delta - \delta = 0$$

where
$\alpha = S^3[E\{k^2(1/s-1)+(1-1/s)\}-q\{k^2(1+\nu)-(1-\nu)\}]$
$\beta = 2S^2[E\{ka(1/s-1)+b(1-1/s)\}-q\{(b/2k^2+ka)(1+\nu)+3b/2(1-\nu)\}]$
$\gamma = S[E\{a^2(1/s-1)+b^2(1-1/s)\}-q\{(2-bka+a^2)(1+\nu)+3b^2(1-\nu)\}]$ $\delta = qb[a^2(1+\nu)+b^2(1-\nu)]$
$k = 2ab/[a^2+b^2+\nu(a^2-b^2)]$
$a$ = initial undeflected outside radius of hose, in inches
$b$ = initial undeflected inside radius of hose, in inches
$\nu$ = Poisson's ratio of the hose
$S$ = degree of set the material takes, expressed decimally
$q$ = desired pressure to seal against, in psi
$E$ = Young's modulus of the material, at the temperature at which q pressure must be sealed against.

4. The method as claimed in claim 2, in which the apex of the radially enlarged portion of the nipple is a crowned apex.

5. The method as claimed in claim 2, in which the apex of the radially enlarged portion of the nipple is a truncated apex.

6. The method as claimed in claim 2, in which the hose is radially deflected to a minimum radial deflection required to obtain a sufficient seal so as to prevent cold leakage down to a temperature equal to the glass transition temperature of the elastomer of the hose to be connected.

7. The method as claimed in claim 2, in which the hose is radially deflected to a minimum radial deflection required to obtain a sufficient seal so as to prevent cold leakage down to a temperature of minus 40° F.

8. The method as claimed in claim 2, in which the apex of the radially enlarged portion of the nipple is from 5% to 40% greater in diameter than the inside diameter of the hose.

9. The method as claimed in claim 2, in which the apex of the radially enlarged portion of the nipple is 18% greater in diameter than the inside diameter of the hose.

10. The method as described in claim 2, in which the reverse taper has at least one circumferential stepped shoulder on its surface.

11. The method as claimed in claim 2, in which the reverse taper rises to the apex at an angle of from 5° to 65°.

12. The method as claimed in claim 2, in which the reverse taper rises to the apex at an angle of 26°.

13. The method as claimed in claim 2, in which the obverse angle falls from the apex at an angle of from 5° to 65°.

14. The method as claimed in claim 2, in which the obverse angle falls from the apex at an angle of 30°.

15. The method as claimed in claim 2, in which the hose is comprised of textile reinforced rubber.

16. The method as claimed in claim 2, comprising the additional step of constructing at least one lock ring, which comprises a substantially frustoconical ring having respective inner and outer surfaces, the inner surface having an angle of taper that substantially corresponds to the reverse taper of a nipple, and seating the lock ring upon an outer surface of the hose juxtaposed such reverse taper.

17. The method as claimed in claim 16, wherein the lock ring further comprises a helical rib on the inner surface of the ring that forms a screw thread which serves to screw the lock ring on to the outer surface of the hose.

18. In a coupled hose of the type that includes an elastomeric hose stretched over a nipple that has an obverse taper extending to a maximum diameter of the nipple and a reverse taper extending from the maximum diameter of the nipple, and wherein the hose has a greater coefficient of expansion than a coefficient of expansion of the nipple, the improvement of a means for sealing the hose and nipple and substantially eliminating cold temperature leakage of a fluid between the nipple and hose at a temperature at which a desired pressure must be sealed against, the improvement comprising:

the nipple having a reverse taper that rises to an apex at said maximum diameter and falls from the apex in an obverse taper, the rise to and fall from the maximum diameter establishing a minimum radial deflection of the hose as required to seal against the desired pressure at a temperature of and for the elastic modulus of the elastomeric material of the hose; and an end portion of the hose stretched over the nipple and radially deflected to at least said minimum radial deflection, and the end portion of the hose radially tensioned against the nipple and thereby sealing the hose and nipple against cold leakage.

19. The product as claimed in claim 18, in which the hose is radially deflected by the apex to a minimum radial deflection which is determined as being a function of the elastic properties of the hose to be connected, in accordance with the relationship:

$$\alpha \Delta^3 + \beta \Delta^2 + \gamma \Delta - \delta = 0$$

where
$\alpha = S^3[E\{k^2(1/s-1)+(1-1/s)\}-q\{k^2(1+\nu)-(1-\nu)\}]$
$\beta = 2S^2[E\{ka(1/s-1)+b(1-1/s)\}-q\{(b/2k^2+ka)(1+\nu)+3b/2(1-\nu)\}]$
$\gamma = S[E\{a^2(1/s-1)+b^2(1-1/s)\}-a\{(2-bka+a^2)(1+\nu)+3b^2(1-\nu)\}]$
$\delta = qb[a^2(1+\nu)+b^2(1-\nu)]$
$k = 2ab/[a^2+b^2+\nu(a^2-b^2)]$ a=initial undeflected outside radius of hose, in inches
b=initial undeflected inside radius of hose, in inches
$\nu$=Poisson's ratio of the hose
S=degree of set of the material takes, expressed decimally
q=desired pressure to seal against, in psi
E=Young's modulus of the material, at the temperature at which q pressure must be sealed against.

20. The product as claimed in claim 18, in which the apex of the radially enlarged portion of the nipple is a crowned apex.

21. The product as claimed in claim 18, in which the apex of the radially enlarged portion of the nipple is a truncated apex.

22. The product as claimed in claim 18, in which the hose is radially deflected to a minimum radial deflection required to obtain a sufficient seal so as to prevent cold leakage down to a temperature equal to the glass transition temperature of the elastomer of the hose to be connected.

23. The product as claimed in claim 18, in which the hose is radially deflected to a minimum radial deflection required to obtain a sufficient seal so as to prevent cold leakage down to a temperature of minus 40° F.

24. The product as claimed in claim 18, wherein the lock ring further comprises a helical rib on the inner surface of the ring that forms a screw thread which serves to screw the lock ring on to the outer surface of the hose.

25. The product as claimed in claim 18 in which the apex of the nipple is from 5% to 40% greater in diameter than the inside diameter of the hose.

26. The product as claimed in claim 18, in which the apex of the radially enlarged portion of the nipple is 18% greater in diameter than the inside diameter of the hose.

27. The product as claimed in claim 18, in which the reverse taper rises to the apex at an angle of from 5° to 65°.

28. The product as claimed in claim 18, in which the reverse taper rises to the apex at an angle of 26°.

29. The product as claimed in claim 18, in which the obverse angle falls from the apex at an angle of from 5° to 65°.

30. The product as claimed in claim 18, in which the obverse angle falls from the apex at an angle of 30°.

31. The product as claimed in claim 18, in which the hose is comprised of textile reinforced rubber.

32. The product of claim 18 which further comprises a substantially frustoconical ring having respective inner and outer surfaces, the inner surface having an angle of taper that substantially corresponds to the reverse taper of the nipple, the lock ring seated upon an outer surface of the hose justaposed such reverse taper.

33. The product of claim 18 wherein the reverse taper has at least one circumferential stepped shoulder.

* * * * *